United States Patent
Witherow, deceased et al.

[15] 3,706,871

[45] Dec. 19, 1972

[54] SELF-SUPPORTED SOLDERING DEVICE

[72] Inventors: William W. Witherow, deceased, late of San Jose, Calif.; by Susan M. W. Rosenburg, legal representative, 3183 El Capitan Avenue, Merced, Calif. 95340

[22] Filed: May 8, 1970

[21] Appl. No.: 35,780

[52] U.S. Cl. .................219/242, 219/230, 219/233, 219/235, 219/533, 228/58, 248/185
[51] Int. Cl. .......H05b 3/02, B23k 3/04, F16m 11/10
[58] Field of Search......................219/221–242, 243, 219/536, 533; 83/170, 171; 228/51–55, 57; 30/140; 248/185

[56] References Cited

UNITED STATES PATENTS

| | | | |
|---|---|---|---|
| 1,767,607 | 6/1930 | Moulthrop | 219/221 |
| 1,951,441 | 3/1934 | Rock | 228/53 |
| 3,267,254 | 8/1966 | Weller et al. | 219/240 X |
| 2,715,669 | 8/1955 | Dicke | 219/235 |
| 2,496,232 | 1/1950 | Potter | 248/185 X |
| 3,480,759 | 11/1969 | Sachs et al. | 219/229 X |
| 2,484,899 | 10/1949 | Mayo | 219/243 X |
| 3,005,898 | 10/1961 | Rosenthal | 219/235 X |
| 381,107 | 4/1888 | Booze | 248/185 |

FOREIGN PATENTS OR APPLICATIONS

| | | | |
|---|---|---|---|
| 540,394 | 10/1941 | Great Britain | 219/85 |
| 878,562 | 10/1961 | Great Britain | 83/171 |

*Primary Examiner*—A. Bartis
*Attorney*—Townsend and Townsend

[57] ABSTRACT

A soldering device having means for permitting it to be supported on a surface to allow the user to hold workpieces in both hands adjacent to the soldering tip of the device. The device is free-standing and has means for pivotally mounting the soldering unit on the upper end of an inclined extension secured to and extending upwardly from a hollow base. The soldering unit is pivotable on the extension into any one of a number of operating positions with respect to the surface on which the base is supported. Means is provided to releasably hold the soldering unit in a fixed position on the extension in any of such operating positions. Switch means on the extension permits the soldering unit to be used while being supported on a surface or when hand-held.

3 Claims, 5 Drawing Figures

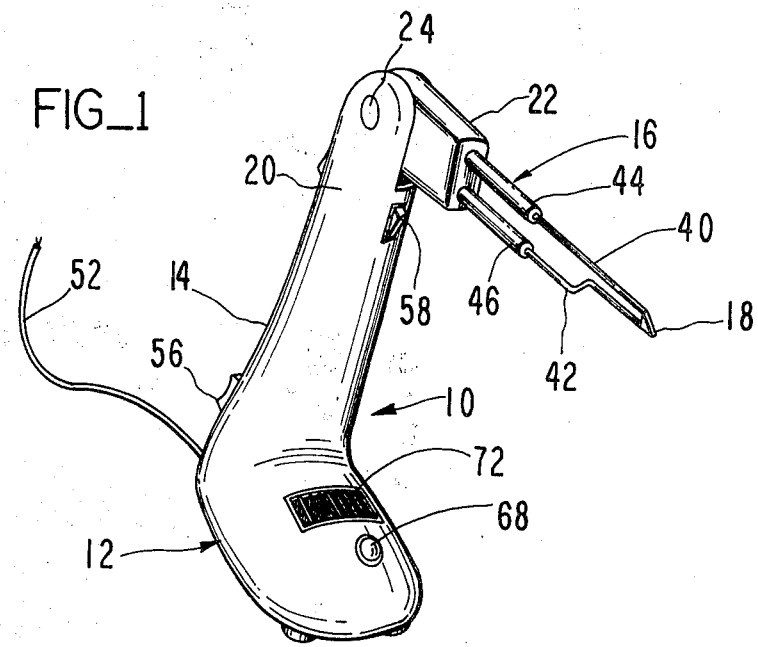
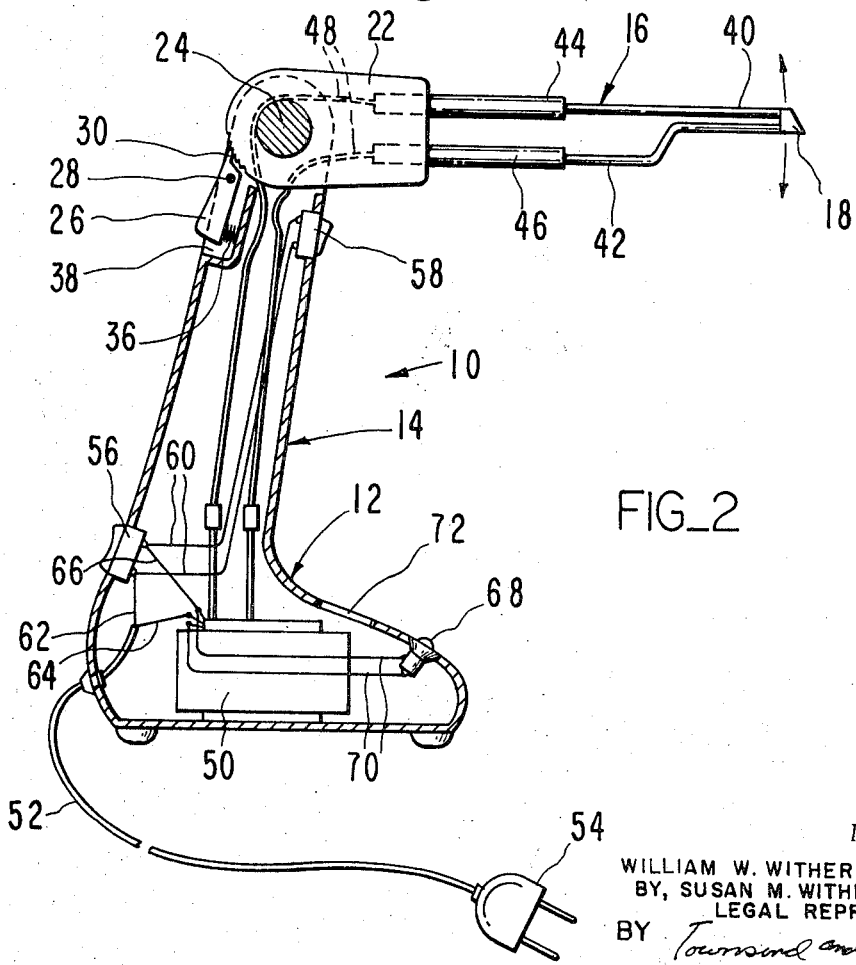

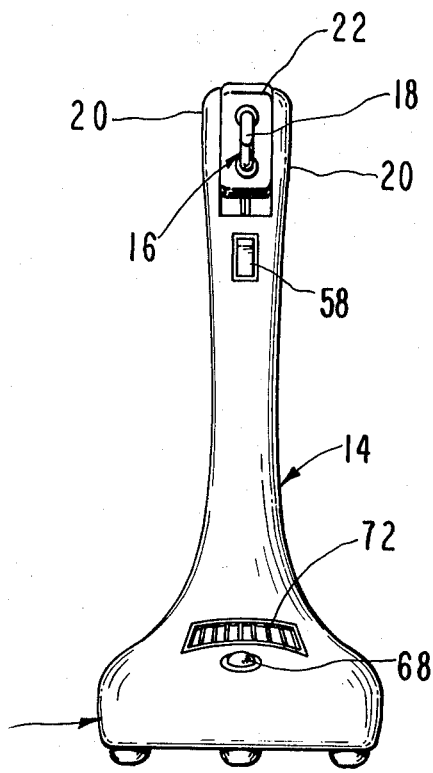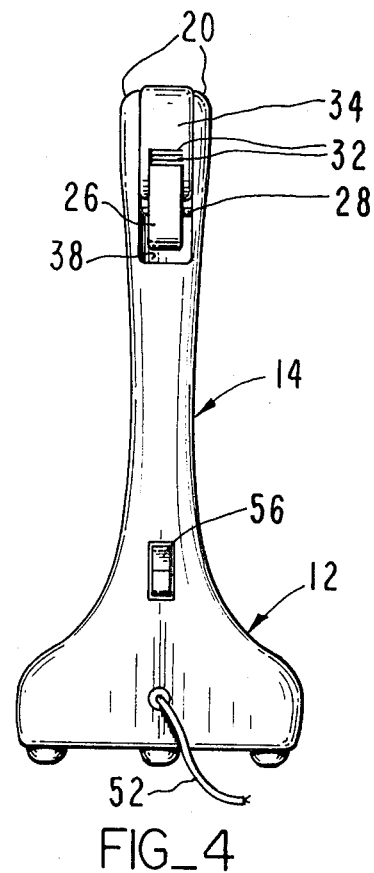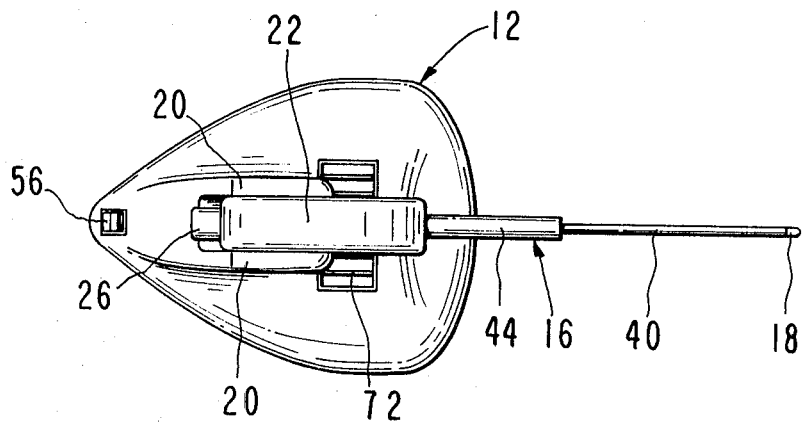

SELF-SUPPORTED SOLDERING DEVICE

This invention relates to improvements in soldering equipment and, more particularly, to a self-supported soldering device whose soldering equipment is adjustable.

In using conventional soldering devices, such as soldering guns or the like, it is necessary to hold the device in one hand while holding a workpiece, such as an electrical wire, in the other hand. Thus, only one hand of the user is free during a soldering operation to handle a workpiece. This limitation oftentimes becomes a factor in properly performing a soldering operation, especially where it is desired to interconnect a pair of workpieces where neither workpiece can be supported without being hand-held.

The present invention is directed to an improved soldering device which permits a soldering unit not only to be self-supporting on a working surface, such as a tabletop or the like, but also to permit the soldering unit to be moved into any one of a number of operative positions depending upon the orientation required by particular workpices to be soldered. The device has means for holding the soldering unit in any one of such operative positions and the holding means can be finger-actuated to allow the soldering unit to be quickly and easily moved from one position to another. The transformer for operating the soldering unit is mounted in the base of the device to provide stability therefor as well as to render the device compact and unitary in construction. One or more switches carried by the device can be used to energize the soldering unit, depending upon whether the device is supported on a surface or whether it is hand-held. The device can also be provided with a light operated from the transformer for directing a light beam toward and onto the tip of the soldering unit. The light is mounted on the base of the device and is at a location which directs light in a manner to avoid a shadow of the tip on a workpiece as occurs with the use of conventional soldering equipment having light sources.

The primary object of this invention is to provide a soldering device which is self-supporting and has a movable soldering unit so that the device can be used without being hand-held and the soldering unit can be shifted into any one of a number of operative positions to facilitate the soldering of many different types of workpieces.

Another object of this invention is to provide a soldering device of the type described which has a transformer in its base to provide stability and compactness and is provided with switch means disposed to allow the device to be continuously energized when the device is on a working surface or to allow the device to be momentarily actuated when hand-held to thereby increase the versatility of the device.

A further object of this invention is to provide a soldering device of the aforesaid character which utilizes a soldering unit which is rotatably mounted on the upper end of a neck-like extension secured to a hollow base with the soldering unit being releasably held in any one of a number of operative positions by a finger-actuated pawl element so that the position of the soldering unit can be quickly and easily changed depending upon the requirements for soldering particular workpieces and the base can be used to house the electrical components and circuitry for the soldering unit to compensate the weight of the same at the lower extremity of the device as well as to conceal the components and circuitry.

Other objects of this invention will become apparent as the following specification progresses, reference being had to the accompanying drawings for an illustration of the invention.

In the drawings:

FIG. 1 is a perspective view of the soldering device;
FIG. 2 is a vertical cross section of the device;
FIG. 3 is a front elevational view of the device;
FIG. 4 is a rear elevation view thereof; and
FIG. 5 is a top plan view of the device.

The soldering device of this invention is broadly denoted by the numeral 10 and includes a base 12, an extension 14 secured to and extending upwardly from the base, and a soldering unit or attachment 16 pivotally mounted on the upper end of extension 14. Device 10 is adapted to be supported on a working surface, such as a tabletop or the like, so that both hands of the user can be free to move workpieces into contact with the tip 18 of unit 16 to effect a soldering of the workpieces together.

Base 12 and extension 15 are hollow as shown in FIG. 2. For purposes of illustration, extension 14 is integral with base 12 and has a pair of opposed upper portions 20 which are spaced apart to receive a head member 22 forming a part of soldering unit 16. A pin 24 mounts head member 22 on portions 20 for rotation about a generally horizontal axis with respect to the surface on which base 12 is supported.

A pawl element 26 is pivotally mounted by means of a pin 28 on extension 14 adjacent to the upper end thereof. Element 26 has a tip 30 which is receivable within any one of a number of notches 32 formed in the arcuate rear periphery 34 of head member 22 (FIGS. 2 and 4). A spring 36 biases pawl element 26 in a clockwise direction when viewing FIG. 2. Thus, tip 30 is biased toward and into a notch 32 aligned therewith. Extension 14 has a recess 38 formed therein for receiving element 26 and spring 36.

Soldering unit 16 includes a pair of rod extensions 40 and 42 which terminate at their outer ends at tip 18 and are secured at their inner ends to tubular projections 44 and 46, respectively, carried by and extending laterally from head member 22.

Soldering unit 16 includes a resistance heating element (not shown) for heating tip 18 to a soldering temperature. For purposes of illustration, a pair of leads 48 extend from projections 44 and 46 interiorly of head member 22 and extension 14 to a transformer 50 carried in base 12 in any suitable manner. The transformer is provided with a lead 52 which extends outwardly from base 12 and has a conventional plug 54 for connection to a 110-V power main. Leads 48 are coupled to the heating element to interconnect the same with the transformer.

A pair of switches 56 and 58 are carried by extension 14. These switches are shown connected in parallel with each other by a pair of leads 60. One wire 62 of lead 52 is coupled with switch 56 and the other wire 64 is coupled to the primary winding of transformer 50. A wire 66 connects the other terminal of switch 56 to the other end of the primary winding.

Switch 58 is of the push button type and is in a location to be actuated by the index finger of the user when device 10 is hand-held. Switch 56 is of the toggle type so that it remains on when it is actuated. Thus, this switch is used when the device is supported on a surface.

A light source 68 is mounted in base 12 at the forward end thereof. This source comprises a light bulb coupled with a pair of leads 70 to a transformer 50 and is actuated when electrical current is supplied by unit 16. The light bulb is disposed to direct a beam of light toward and onto tip 18 to illuminate workpieces adjacent thereto. The location of the light bulb is such as to eliminate the shadow of the tip on the workpieces, one of the drawbacks of conventional soldering devices which use a light source.

Base 12 is also provided with a vent 72 adjacent to and above transformer 50 to vent hot air to the atmosphere. This feature eliminates overheating of air within the interior of the base.

In use, device 10 is mounted on a working surface and plug 54 is connected to a power main. When switch 56 is actuated, electrical power is supplied to unit 16 to heat tip 18. Thus, two workpieces can be hand-held adjacent to the tip and can be soldered together. Light from source 68 will be directed onto the tip and the workpieces to illuminate the soldering area.

When it is desired to change the position of soldering unit 16, element 26 is rotated in a counterclockwise sense when viewing FIG. 2 unit the desired position of the soldering unit is reached. The element is then released so that tip 30 will be received within the aligned notch 32.

When it is desired to hold the device by the hand, extension 14 is gripped in the hand and, with switch 56 in the off position, switch 58 is actuated by the index finger to supply electrical power to the soldering unit. Again, light from source 68 will be directed onto the tip to illuminate the same. Also, the operative position of unit 16 can be changed by manipulation element 26.

As shown in FIG. 2, extension 14 is coupled to the rear extremity of base 12 and extends upwardly and forwardly therefrom so as to be slightly inclined. This construction positions the junction between the extension and head member 22 above transformer 50 and improves the stability of device 10.

What is claimed is:

1. A soldering device comprising: a hollow base adapted to be supported on a surface; a hollow forwardly inclined extension secured to and extending upwardly from a rear portion of the base and of such configuration as to be adapted to be hand-held; an elongated hollow head member pivotally mounted adjacent to one end thereof on the upper end of the extension and extending forwardly therefrom; an electrically heated soldering unit secured to and extending outwardly from the opposite end of the head member, said unit having a soldering tip at its outermost end; a pawl element pivotally mounted on the rear side of the extension adjacent to the upper end thereof, said head member having an arcuate outer periphery on said one end provided with a number of notches alignable with the pawl element when the soldering unit is in operative positions corresponding to respective notches; means biasing the pawl element toward the head member; a transformer mounted in said base and adapted to be coupled to a source of electrical power; means extending through said head member and said extension for interconnecting the transformer and the soldering unit to permit the latter to be energized when the transformer is connected to said power source; and switch means carried by the extension on the front side thereof and in a position for controlling the electrical power supplied to the transformer when the extension is hand-held.

2. A soldering device as set forth in claim 1, wherein said base has a pair of opposed extremities, said extension being secured at its lower end to one of the extremities of the base and being inclined substantially throughout its entire length toward the other extremity of the base.

3. A device as set forth in claim 2, wherein is provided a light source carried by the base adjacent to said other extremity thereof, said light source being disposed to direct a beam of light upwardly and onto said soldering tip.

* * * * *